March 30, 1965  G. C. KAUER, JR., ETAL  3,175,572
AUTOMATIC CONDENSATE-REMOVAL VALVE
Filed Sept. 11, 1962  2 Sheets-Sheet 1

INVENTORS
GEORGE C. KAUER, JR.
LOUIS E. BROOKS
BY *Harry Cole*

ATTORNEY

March 30, 1965   G. C. KAUER, JR., ETAL   3,175,572
AUTOMATIC CONDENSATE-REMOVAL VALVE
Filed Sept. 11, 1962   2 Sheets-Sheet 2

INVENTORS
GEORGE C. KAUER, JR.
LOUIS E. BROOKS
BY *Harry Cok*
ATTORNEY

United States Patent Office 3,175,572
Patented Mar. 30, 1965

3,175,572
AUTOMATIC CONDENSATE-REMOVAL VALVE
George C. Kauer, Jr., Westbury, and Louis E. Brooks, Great Neck, N.Y., assignors to Air Techniques, Inc., New Hyde Park, N.Y., a corporation of New York
Filed Sept. 11, 1962, Ser. No. 222,794
5 Claims. (Cl. 137—204)

Our present invention relates to means for automatically discharging condensate liquid from a compressed air system and more particularly to a valve device operable automatically to discharge condensate from the system.

In accordance with this invention and pursuant to a prime object thereof, the valve device is operable automatically in response to variations in the fluid pressure in the system to effect the condensate removal operation. More particularly, in compressed air systems, the operation of the air compressor is controlled by a pressure responsive switch or relay which controls the circuit of an electric motor which actuates the compressor, to restore the air pressure when it decreases to a predetermined pressure and to stop the compressor motor when the pressure is restored to the desired higher pressure for the system. The valve device of the present invention in a specific embodiment thereof, is operable upon a decrease in pressure in the system to drain condensate therefrom.

Another object of the invention is to provide a condensate drain valve which is self adjustable automatically to varying condensate load conditions and which is effective to start the drainage operation automatically and to continue the drainage operation until all, or substantially all of the accumulated condensate is removed.

The above and other objects, features and advantages of this invention will be more fully understood from the following description of the presently preferred embodiment of the invention, reference being had to the accompanying illustrative drawings.

Figure 5:
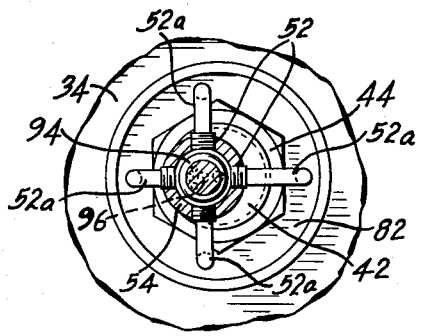
Figure 6:
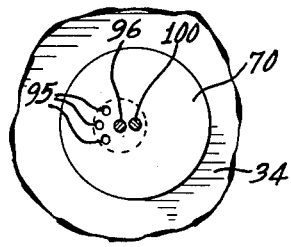
Figure 4:
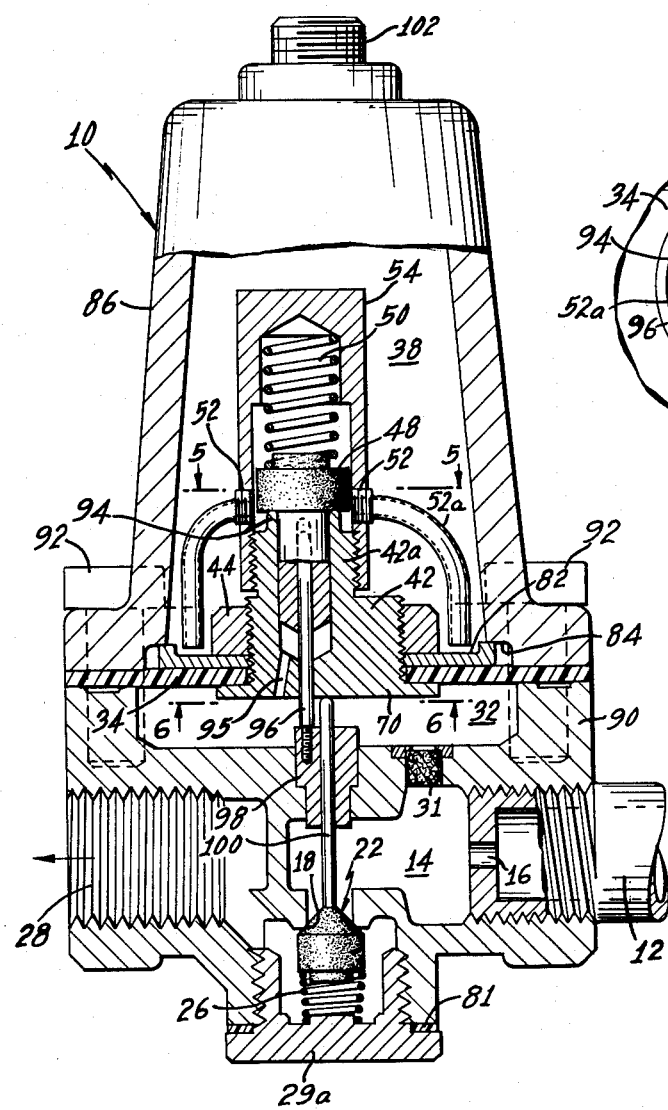
FIG. 4 is a view similar to FIG. 1, showing another form of the invention.

FIGS. 5 and 6 are sectional views on the lines 5—5 and 6—6, respectively, of FIG. 4.

Referring now to the drawings in detail, the drainage device comprises a casing 10 provided with a fluid inlet 12 for the admission of fluid from the compressed air system. Said device can be located at any low point in the compressed air piping system; for example, at the bottom of air receivers, at the bottom of air filters, or at any other point or points in the system where condensate accumulates and the pressure varies between the pressure at which the compressor starts to operate and the higher pressure at which the operation of the compressor is interrupted. Casing 10 has a chamber 14 which is in communication with inlet 12 through an orifice or small opening 16. The fluid outlet of chamber 14 is defined by the valve seat 18 which is peripherally continuous and is engaged by the valve washer 20 of the valve member 22 which is movable in and guided by the inner casing wall part 24 which is slidably engaged by said valve member. Orifice 16 is small in comparison with inlet 12 so that when valve 22 opens partly during condensate drainage as a result of decrease of fluid pressure in chamber 14, as hereinafter more fully described, the valve remains partly open until the drainage is completed and air begins to flow through said orifice. As soon as air starts to flow through said orifice, the pressure drop in chamber 14 increases sufficiently to cause valve 22 to move to its wide open position followed by the substantially instantaneous closing of said valve. This operation is hereinafter described in further detail. A compression spring 26 which is positioned in compressed condition between the screw-adjustable casing cap 29 and valve member 22, as shown, normally holds said valve member in its closed position against valve seat 18. When valve member 22 is opened by being moved out of engagement with seat 18, fluid can pass from chamber 14 to and through the fluid outlet 28 for the drainage of condensate from the system.

Valve 22 is opened and closed in response to variations in pressure in the system or in the part of the system to which the drainage device is connected. For this purpose chamber 14 is in communication through an opening 30 with a chamber 32 at one side of a flexible diaphragm 34 secured in said chamber by casing member 36 which is screw threaded into casing 10 at one end thereof in fluid-tight relation. Opening 30 is provided with a filter 31 to prevent the passage of scale or other foreign matter from entering chamber 32. A chamber 38 is provided in casing 10 at the opposite side of diaphragm 34. Fluid can flow between chambers 32 and 38 through the passage 40 in member 42 which is secured to the central part of said diaphragm by valve-seat member 44 having an opening 46, in communication with passage 40. Members 42 and 44 are in secure screw threaded engagement with each other and are clamped to the central part of the diaphragm in fluid-tight relation.

A spring pressed valve 48 is sealed on the valve seat member 44 under pressure of compression spring 50 to releasably close opening 46 and thereby seal chamber 38 from chamber 32 through openings 52 provided in the valve spring housing 54 which is bodily movable with diaphragm 34. As shown, housing 54 is secured to member 44 by being screwed thereon. An end casing member 56 and its cap 58 together with diaphragm 34 define the fluid tight chamber 38 at one end of casing 10, said chamber 38 being in controlled communication with chamber 32 by valve controlled passage 40. It will be noted that filter 31 prevents the clogging or partial clogging of passage 40 and prevents interference with the full sealing of valve 48 which could occur if foreign matter were not held back by said filter. Cap 29 is provided with an opening 80 for the discharge of fluids which might accumulate below valve 22.

A valve stem member 60 has a sliding fit in an opening 62 in the wall 64 which is provided with the opening 30 between chambers 14 and 32. Said member 60 has an end portion 66 which engages valve member 22 and a portion 68 which is engaged at its end by the flange 70 of member 42 which is clamped to and moves with diaphragm 34. Accordingly, when the diaphragm is flexed by fluid pressure in chamber 38 in opposition to the fluid pressure in chamber 32 stem 60 is moved by the diaphragm in a direction to disengage valve washer 20 from valve seat 18 and thereby provide a fluid passage from chambers 32 and 14 to and through the casing outlet 28.

The part 68 of valve stem 60 has a central bore 72 in which a pin 74 is disposed. A slot 73 is provided for the passage of fluid to passage 40. Said pin 74 has an end portion which is disposed in passage 40. A cross pin is secured to pin 74 and is positioned in a transverse opening 78 at the inner end of bore 72. The diameter of opening 78 is sufficiently larger than the diameter of pin 76 to avoid interference with the required movement of valve stem 60 and engages the casing wall 64 to prevent movement of pin 74 when diaphragm 34 is moved by the greater pressure in chamber 38 to open valve 22, and so that said movement of the diaphragm results in the engagement of valve 48 with the adjacent end of pin 74 and the consequent opening of valve 48 against the closing pressure thereon.

The above described valve device operates in the following manner which is at least partly obvious from the above description. When the valve device is installed, the pressure at inlet 12 and in chambers 14, 32 and 38 are the same, namely, at atmospheric pressure and valve 22 is closed. As the system pressure rises at inlet 12, due to the operation of the compressor, the pressure also increases in chambers 14, 32 and 38, said pressure being sufficient to open valve 48 against the pressure of spring 50. During the rise in pressure, the pressure at inlet 12 and in chambers 14 and 32 will be equal while the pressure in chamber 38 will be lower than in chamber 32 due to the force of spring 50 on valve 48. Therefore, the pressure in chamber 32 against the diaphragm 34 will be in a direction which has no tendency to open valve 22 which is held closed by spring 26 against the pressure in chamber 14 for the maximum pressure in the system. Upon a decrease in the pressure in the system, communicated to inlet 12 and to chamber 14 through orifice 16, the pressure in chambers 14 and 32 decreases but this decrease is not immediately communicated to chamber 38 because valve 48 remains closed temporarily due to the greater pressure in chamber 38. This greater pressure acts on diaphragm 34 and causes the latter to move valve stem 60 in a direction to open valve 22. The opening of valve 22 further reduces the pressure in chamber 14 and 32 so that the diaphragm moves further against valve stem 60 and is effective, by reason of the retained pressure in chamber 38 thereon, to fully snap-open valve 22. This results in the engagement of valve 48 with pin 74 so that valve 48 opens, thereby relieving the excess pressure in chamber 38 and equalizes the pressure in chambers 38 and 32. This is followed by a partial closing of valve 20 by spring 26 thereby reducing the flow of fluid from chamber 14 to outlet 28, so that pressure builds up in chamber 32 and spring 26 and the pressure in chamber 32 on the diaphragm are effective to close valve 20 with a snap action. Thereafter, as the pressure rises in chamber 32 it also rises in chamber 38 until valve 48 is closed.

The above description of valve operation holds true when air with a trace of water droplets or no water is transmitted to the valve at inlet 12. On the other hand, if the fluid transmitted to inlet 12 is mainly or entirely a stream of water, valve 22 will then open only partly until all of the condensate is drained, but as soon as air substantially free of water passes into chamber 14 through orifice 16, the resulting pressure drop in chamber 14 increases and the valve 22 snaps wide open and in so doing brings about its subsequent snap-closing as above described. Thus valve 22 opens partly upon a relatively small drop in pressure between inlet 12 and chamber 14 due to the flow of water into chamber 14 but does not fully open because the decrease in pressure in chambers 14 and 32 is not sufficiently great to allow the pressure in chamber 32 to move the diaphragm 34 a sufficient distance to move valve stem 60 for full valve opening and is not sufficient to cause pin 74 to engage control valve 48 to open said control valve. When water is being drained, some water will pass into chamber 32 and might also enter chamber 38, through passage 40 but the water level in chamber 38 will not rise above the valve seat of control valve 44. When valve 22 is moved to its fully open position shortly after the flow of water through orifice 16 into chamber 14 stops, the water flows rapidly from chamber 32 through filter 31 and thereby cleans the filter automatically at the end of each draining operation so that the danger of clogging of the filter by matter present in the water admitted into chamber 32 from inlet 12 is negligible.

Figure 1:
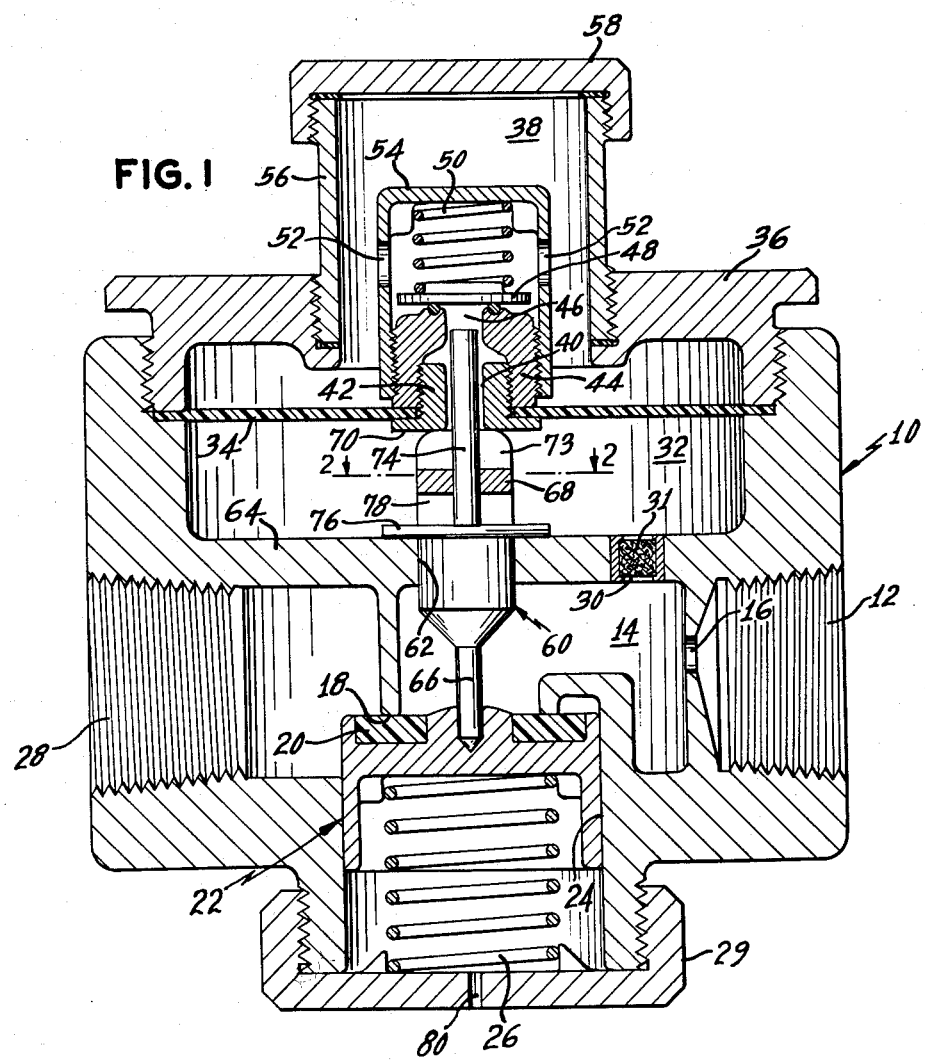
FIG. 1 is a vertical sectional view of an automatically operable pressure-responsive valve embodying the invention.
Figure 2:
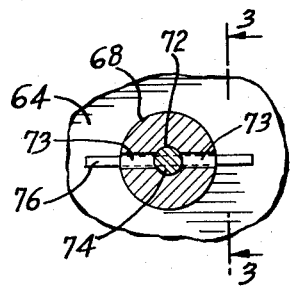
FIG. 2 is a detail sectional view on the line 2—2 of FIG. 1.
Figure 3:
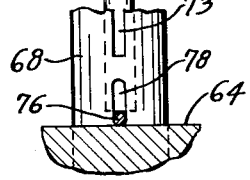
FIG. 3 is a sectional view on the line 3—3 of FIG. 2.

The form of the invention illustrated by FIGS. 4 to 6 is essentially similar to the above described form of the invention with the exceptions hereinafter indicated or apparent from the drawings. The parts in FIG. 4 which are sufficiently similar to corresponding parts in FIG. 1, are designated by the same numerals as in FIG. 1. Cap 29a is imperforate and a gasket 81 is provided, vent opening 80 of cap 29 (FIG. 1) being unnecessary since outlet 28 (FIG. 4) is in communication with the space under valve 22. Diaphragm 34 is clamped against a rigid disk 82, by members 44 and 70, which is positioned to engage an internal shoulder 84 of the valve bonnet 86 and said flange is clamped between said bonnet and the valve body 90 to which said bonnet is secured by screws indicated at 92 in a well known way. The valve seat 94 is integral with metal member 42a and is engaged by the resilient valve 48 biased to closed position by the spring 50 and the fluid pressure in chamber 38 as described above. As here shown, member 42a is an integral part of member 42 and the fluid passages 95 replace passages 40 and 73 of FIG. 1. Pin 96 fixed in the stationary guide sleeve 98 replaces pin 78 and part 76 of FIG. 1. The valve stem 100 of valve 22 is slidable in guide sleeve 98. The valve bonnet 86 is provided with a removable fluid-tight closure 102 for an opening which provides access to the interior of said bonnet when required. If desired, vertical tubes 52a may be connected to openings 52 and positioned with their lower ends close to washer 82 so that substantially all of the moisture which may be present in chamber 38 will discharge through said tubes and valve 48 when the latter is opened as above described.

It will be understood that the drain device of the present invention (both forms) normally operates when the air which enters inlet 12 contains moisture in the form of droplets, but it might happen that the air supply system could operate wtih considerable water flowing into chamber 14 through inlet orifice 16, for example, during periods of considerable moisture condensation in the air system.

While we have shown and described the preferred embodiments of our invention, it will be understood that the invention may be embodied otherwise than as herein specifically illustrated or described, and that certain changes in the form and arrangement of parts and in the specific manner of practicing the invention may be made without departing from the underlying ideas or principles of this invention within the scope of the appended claims.

We claim:

1. In an automatic condensate removal device, a casing having a first chamber, a restricted inlet and an outlet in said casing communicating with said first chamber, biased closed main valve means operative in said first chamber for controlling flow between said inlet and said outlet and being openable in the direction of flow from said inlet to said outlet, a second chamber in said casing in communication with said first chamber, fluid pressure responsive means dividing said second chamber into two portions and being movable relative to said casing in response to a pressure differential between said portions, valve stem means extending from said main valve means toward said pressure responsive means and being movable relative to said pressure responsive means, said fluid pressure responsive means being operable to abut said valve stem means to open said main valve means against its bias responsive to a predetermined pressure differential in a given direction between said second chamber portions and to permit closure of said main valve means responsive to termination of said pressure differential, additional biased closed valve means carried by said pressure responsive means for communicating said portions of the second chamber and arranged so as to prevent flow between said second chamber portions when the pressure differential is in said given direction, and to open to permit flow between said second chamber portions responsive to a pressure differential in a direction opposite said given direction, and pin means extending from said casing toward said additional valve means through said pressure responsive means for mechanically opening said additional valve means by abutment therewith when the pressure differential moves said pressure responsive means a predetermined distance in main valve opening direction.

2. In an automatic condensate removal device, a casing having a first chamber, a restricted inlet and an outlet in said casing communicating with said first chamber, biased closed main valve means operative in said first chamber for controlling flow between said inlet and said outlet and being openable in the direction of flow from said inlet to said outlet, a second chamber in said casing, passage means in said casing placing said first and second chambers in fluid flow communication, fluid pressure responsive means dividing said second chamber into two portions and being movable relative to said casing in response to a pressure differential between said portions, valve stem means extending from said main valve means toward said pressure responsive means and being movable relative to said pressure responsive means, said fluid pressure responsive means being operable to abut said valve stem means to open said main valve means against its bias responsive to a predetermined pressure differential in a given direction between said second chamber portions and to permit closure of said main valve means responsive to termination of said pressure differential, additional biased closed valve means carried by said pressure responsive means for communicating said portions of the second chamber and arranged so as to prevent flow between said second chamber portions when the pressure differential is in said given direction, and to open to permit flow between said second chamber portions responsive to a pressure differential in a direction opposite said given direction, and pin means extending from said casing toward said additional valve means through said pressure responsive means for mechanically opening said additional valve means by abutment therewith when the pressure differential moves said pressure responsive means a predetermined distance in main valve opening direction, and filter means in said passage means for filtering fluid flowing from said first chamber to said second chamber, said filter means being self-cleansing during fluid flow from said second chamber to said first chamber.

3. In an automatic condensate removal device, a casing having a first chamber, a restricted inlet and an outlet in said casing communicating with said first chamber, biased closed main valve means operative in said first chamber for controlling flow between said inlet and said outlet, a second chamber in said casing, passage means in said casing placing said first and second chambers in fluid flow communication, fluid pressure responsive means dividing said second chamber into two portions and being movable in response to a pressure differential between said portions, valve stem means extending between said fluid pressure responsive means and said main valve means and movable with the former for opening the latter against its bias responsive to a predetermined pressure differential in a given direction between said second chamber portions and to permit closure of said main valve means responsive to termination of said pressure differential, additional biased closed valve means communicating said portions of the second chamber and arranged so as to prevent flow between said second chamber portions when the pressure differential is in said given direction, and to open to permit flow between said second chamber portions responsive to a pressure differential in a direction opposite said given direction, and pin means slidably positioned in said valve stem means and having a portion thereof which abuts said casing, said pin means being operable to abut and open said additional valve means when the pressure differential moves said pressure responsive means and said valve stem means a predetermined distance in main valve opening direction.

4. In an automatic condensate removal device, a casing having a first chamber, a restricted inlet and an outlet in said casing communicating with said first chamber, biased closed main valve means operative in said first chamber for controlling flow between said inlet and said outlet, a second chamber in said casing, passage means in said casing placing said first and second chambers in fluid flow communication, fluid pressure responsive means dividing said second chamber into two portions and being movable in response to a pressure differential between said portions, valve stem means extending between said fluid pressure responsive means and said main valve means and movable with the former for opening the latter against its bias responsive to a predetermined pressure differential in a given direction between said second chamber portions and to permit closure of said main valve means responsive to termination of said pressure differential, additional biased closed valve means communicating said portions of the second chamber and arranged so as to prevent flow between said second chamber portions when the pressure differential is in said given direction, and to open to permit flow between said second chamber portions responsive to a pressure differential in a direction opposite said given direction, and pin means slidably positioned in said valve stem means and having a portion thereof which abuts said casing, said pin means being operable to abut and open said additional valve means when the pressure differential moves said pressure responsive means and said valve stem means a predetermined distance in main valve opening direction, and filter means in said passage means for filtering fluid flowing from said first chamber to said second chamber, said filter means being self-cleansing during fluid flow from said second chamber to said first chamber.

5. In an automatic condensate removal device, a casing having a lower chamber, a restricted inlet and an outlet in said casing communicating with said lower chamber, biased closed main valve means operative in said lower chamber for controlling flow between said inlet and said outlet, an upper chamber in said casing, diaphragm means dividing said upper chamber into upper and lower portions and being movable in response to a pressure differential between said portions, passage means in said casing placing said lower chamber and said lower portion of said upper chamber in fluid flow communication, valve stem means slidably mounted in said casing between said lower chamber and lower portion of said said upper chamber, respectively, and extending between said diaphragm means and said main valve means, said valve stem means being movable with said diaphragm means for opening said main valve means against its bias responsive to a predetermined pressure differential in a given direction between said upper and lower portions of said upper chamber and to permit closure of said main valve means responsive to termination of said pressure differential, passage means in said diaphragm means for placing said upper and lower portions of said upper chamber in fluid flow communication, additional biased closed valve means carried by said diaphragm means in said upper portion of said upper chamber and arranged so as to close said passage means in said diaphragm means to prevent fluid flow between said upper and lower portions of said upper chamber when the pressure differential therebetween is in said given direction, and to open to permit flow between said upper and lower portions of said upper chamber through said passage means in said diaphragm means in response to a pressure differential between said upper and lower portions of said upper chamber in a direction opposite to said given direction, and pin means slidably positioned in said valve stem means and having a portion thereof which abuts said casing to limit the movement of said pin means in main valve opening direction, said pin means extending through said passage means in said diaphragm means and being operable to abut and open said additional valve means when the pressure differential between said upper and lower portions of said upper chamber moves said diaphragm means and said valve stem means a predetermined distance in main valve opening direction.

References Cited by the Examiner

UNITED STATES PATENTS

| | | | |
|---|---|---|---|
| 1,083,521 | 1/14 | Chapsal | 303—83 |
| 2,345,379 | 3/44 | Campbell | 137—204 |
| 2,861,587 | 11/58 | Hursen | 137—494 |

FOREIGN PATENTS 58,241  1891  Germany.

WILLIAM F. O'DEA, *Primary Examiner.*